(12) United States Patent
Ohsugi et al.

(10) Patent No.: US 11,276,310 B2
(45) Date of Patent: Mar. 15, 2022

(54) INFORMATION PROVIDING DEVICE FOR PROVIDING VARIOUS TYPES OF INFORMATION USING INFORMATION PRESENTATION SOUNDS

(71) Applicant: MAZDA MOTOR CORPORATION, Hiroshima (JP)

(72) Inventors: Ikuyo Ohsugi, Aki-gun (JP); Hisanobu Ino, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/975,316

(22) PCT Filed: Feb. 28, 2019

(86) PCT No.: PCT/JP2019/007883
§ 371 (c)(1),
(2) Date: Aug. 24, 2020

(87) PCT Pub. No.: WO2019/172084
PCT Pub. Date: Sep. 12, 2019

(65) Prior Publication Data
US 2020/0402403 A1 Dec. 24, 2020

(30) Foreign Application Priority Data
Mar. 8, 2018 (JP) .............................. JP2018-041477

(51) Int. Cl.
*G10K 15/04* (2006.01)
*G08G 1/16* (2006.01)
*B60R 11/02* (2006.01)

(52) U.S. Cl.
CPC ............ *G08G 1/16* (2013.01); *B60R 11/0217* (2013.01); *G10K 15/04* (2013.01)

(58) Field of Classification Search
None
See application file for complete search history.

(56) References Cited

U.S. PATENT DOCUMENTS 7,679,988 B2 * 3/2010 Fink .................. G10K 11/02
367/11
9,384,638 B2 * 7/2016 Yamano ................. G08B 3/10
(Continued)

FOREIGN PATENT DOCUMENTS

JP H08118991 A 5/1996
JP H11208370 A 8/1999
(Continued)

OTHER PUBLICATIONS

International Search Report issued in PCT/JP2019/007883; dated May 7, 2019.
(Continued)

*Primary Examiner* — John F Mortell
(74) *Attorney, Agent, or Firm* — Studebaker & Brackett PC

(57) ABSTRACT

An information providing device provides various types of information by using an information presentation sound including a fundamental tone, and at least one harmonic tone having a frequency equal to an integral multiple of a frequency of the fundamental tone. The information providing device includes a pitch setting unit that sets the pitch of the information presentation sound, and an information presentation sound output unit that outputs the information presentation sound having the pitch set by the pitch setting unit. When it is assumed that a weighted average of frequencies weighted by a parameter associated with a sound pressure is a centroid frequency, the pitch setting unit variably sets the centroid frequency of the information presentation sound according to a type of information to be provided.

20 Claims, 7 Drawing Sheets

(56) References Cited

U.S. PATENT DOCUMENTS

| | | | |
|---|---|---|---|
| 9,613,508 B2* | 4/2017 | Park | G08B 17/00 |
| 10,465,509 B2* | 11/2019 | Yao | E21B 47/085 |
| 2006/0288291 A1* | 12/2006 | Lee | H04N 5/147 |
| | | | 715/723 |
| 2013/0034244 A1 | 2/2013 | Van Raalte et al. | |
| 2018/0233118 A1* | 8/2018 | Van Den Broeck | G10D 13/20 |
| 2018/0277091 A1 | 9/2018 | Niibe et al. | |
| 2018/0366103 A1 | 12/2018 | Niibe et al. | |

FOREIGN PATENT DOCUMENTS

| | | |
|---|---|---|
| JP | 2013015969 A | 1/2013 |
| JP | 2016-145885 A | 8/2016 |
| JP | 2017-181920 A | 10/2017 |
| JP | 2017181916 A | 10/2017 |
| WO | 2011/072737 A1 | 6/2011 |

OTHER PUBLICATIONS

The extended European search report issued by the European Patent Office dated Mar. 31, 2021, which corresponds to European Patent Application No. 19764023.8-1001 and is related to U.S. Appl. No. 16/975,316.

* cited by examiner

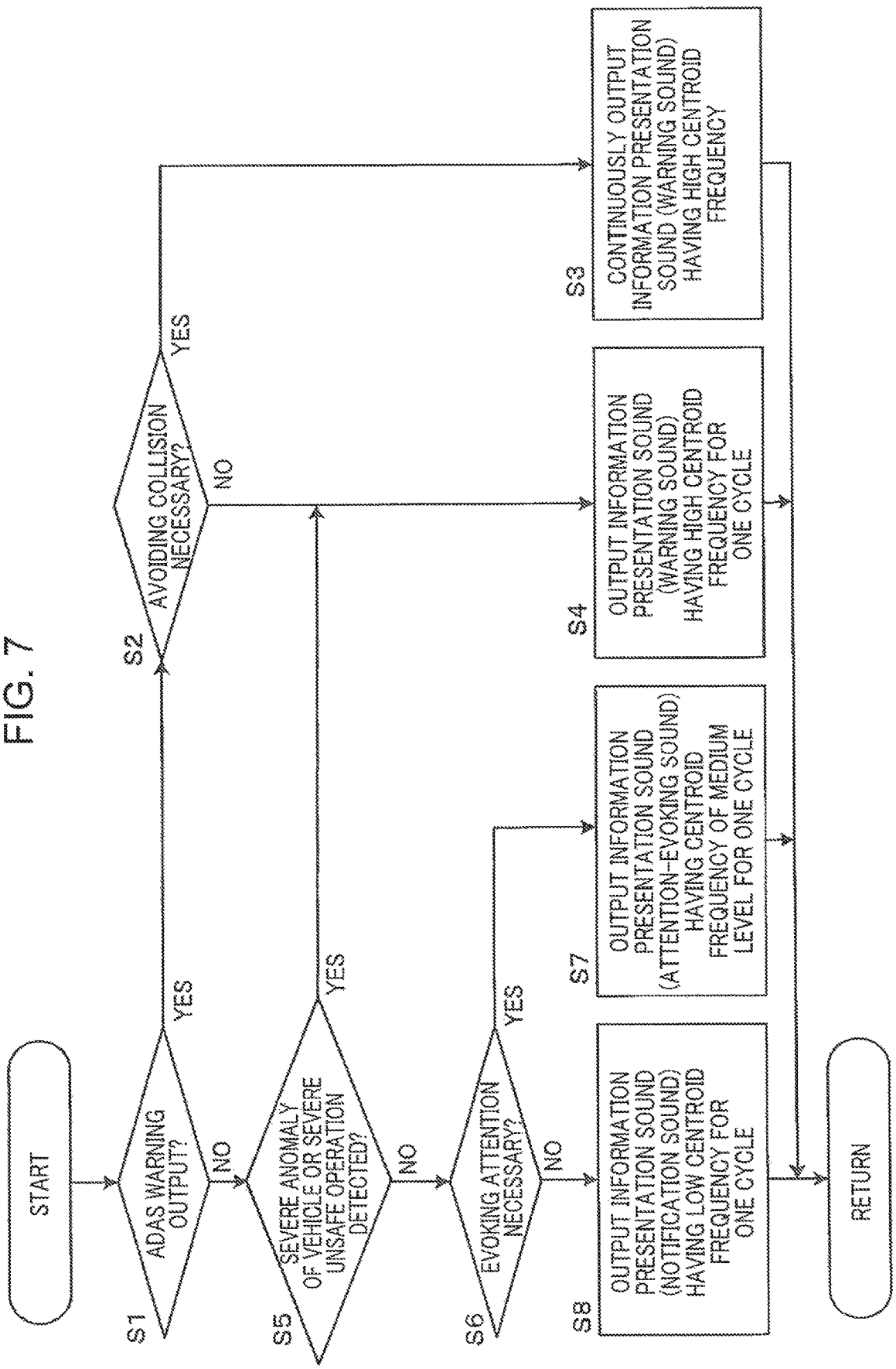

INFORMATION PROVIDING DEVICE FOR PROVIDING VARIOUS TYPES OF INFORMATION USING INFORMATION PRESENTATION SOUNDS

TECHNICAL FIELD

The present invention relates to an information providing device that provides various types of information by using an information presentation sound.

BACKGROUND ART

Conventionally, in a vehicle such as an automobile, there has been used an information providing device that provides information such as an occurrence of a danger, and execution of an appropriate operation with respect to various types of equipment by using a predetermined information presentation sound (a sound presenting a content of information such as an alarm sound and an operation sound of various types of equipment). For example, Patent Literature 1 discloses an invention of a vehicle alarm device, wherein a sound range of an alarm sound is changed according to a level of danger. Further, Patent Literature 2 discloses an invention of a vehicle travel assist device, wherein a driver is effectively alerted by using an alarm sound providing a sense of instability.

In recent years, the number of pieces of information to be provided by an information providing device is increasing. As a result, various types of information presentation sounds respectively corresponding to a variety of types of information are used. When information presentation sounds become diverse as described above, a user may feel it difficult to appropriately discriminate what type of information is the information provided by each of the information presentation sounds, particularly, what level of emergency (degree of importance or degree of danger) the information has.

CITATION LIST

Patent Literature

Patent Literature 1: Japanese Unexamined Patent Application Publication No. H8-118991
Patent Literature 2: Japanese Unexamined Patent Application Publication No. H11-208370

SUMMARY OF INVENTION

In view of the above-described circumstances, an object of the present invention is to provide an information providing device that provides various types of information by using an information presentation sound, which enables presentation of a variety of sounds, and allows a user to appropriately discriminate a type (e.g. a level of emergency) of information notified by the information presentation sound.

As a means for achieving the above object, the present invention is directed to an information providing device that provides various types of information by using an information presentation sound including a fundamental tone, and at least one harmonic tone having a frequency equal to an integral multiple of a frequency of the fundamental tone. The information providing device includes: a pitch setting unit that sets a pitch of the information presentation sound; and an information presentation sound output unit that outputs the information presentation sound having the pitch set by the pitch setting unit. When it is assumed that a weighted average of frequencies weighed by a parameter associated with a sound pressure is a centroid frequency, the pitch setting unit variably sets the centroid frequency of the information presentation sound according to a type of information to be provided.

The present invention is able to generate abundant variations of information presentation sounds by combination of the fundamental tone and the harmonic tone, and clearly convey a type of provided information (e.g. a level of emergency), based on the pitch of the information presentation sound to be evaluated by the centroid frequency (spectral centroid).

BRIEF DESCRIPTION OF DRAWINGS

FIG. 7 is a flowchart illustrating a procedure of control (information providing control) of providing an information presentation sound.

DESCRIPTION OF EMBODIMENTS

In the following, an embodiment according to the present invention is described with reference to the accompanying drawings.

Figure 1:
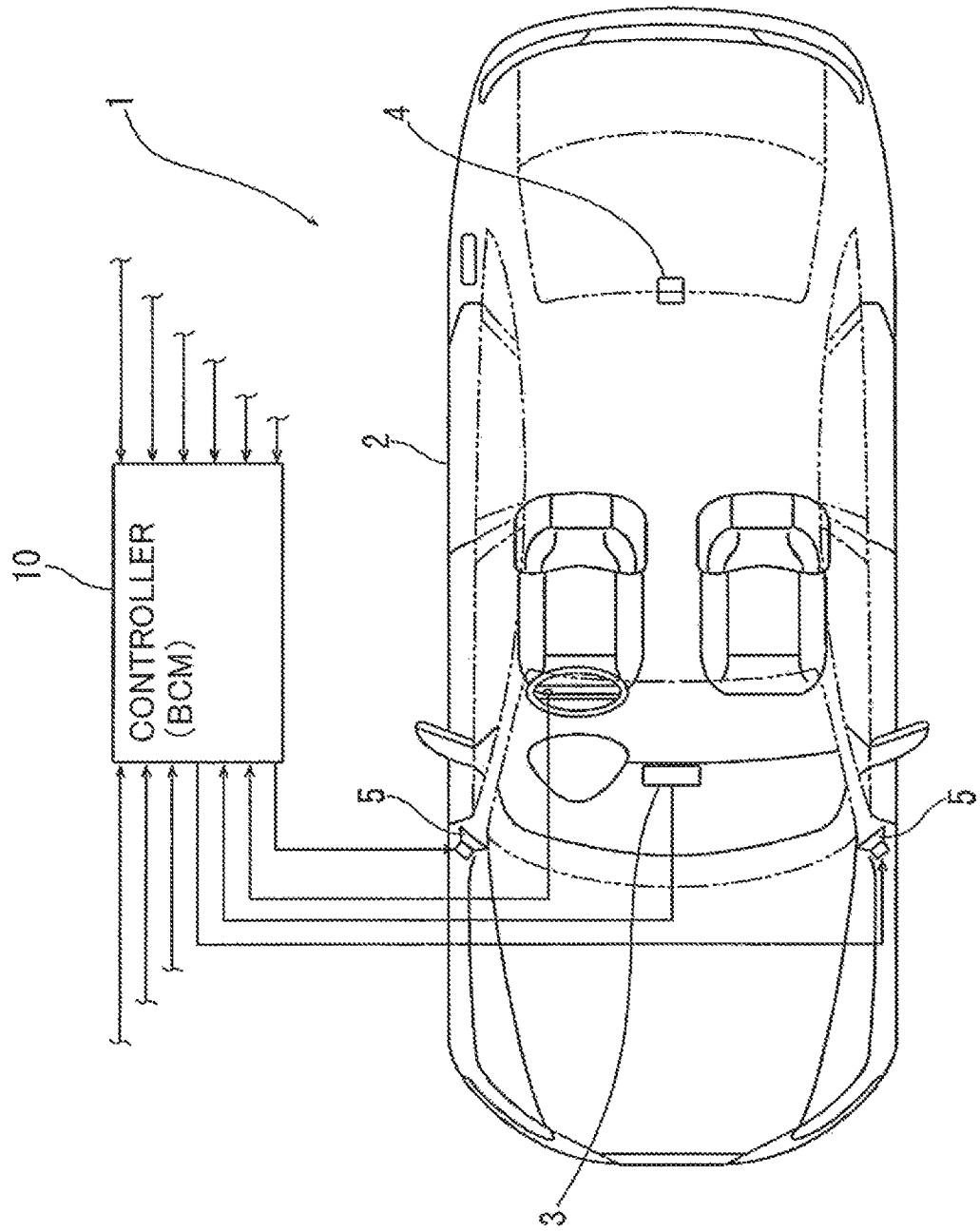
FIG. 1 is a diagram illustrating an overall configuration of a vehicle including an information providing device according to one embodiment of the present invention.
Figure 2:
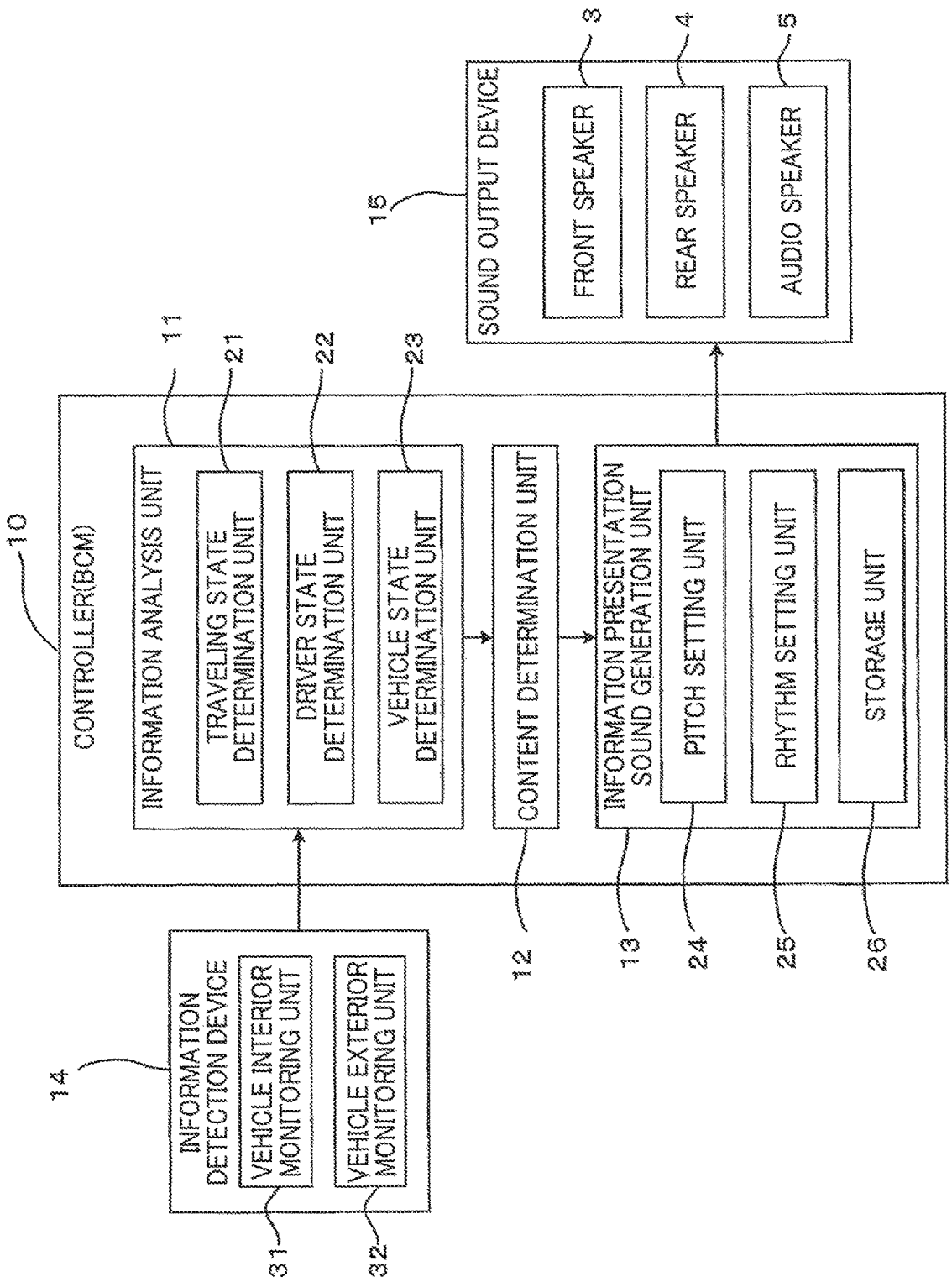
FIG. 2 is a block configuration diagram illustrating one example of a control system of the information providing device.

FIG. 1 is a diagram illustrating an overall configuration of a vehicle 1 including an information providing device according to one embodiment of the present invention. FIG. 2 is a block configuration diagram illustrating a control system of the information providing device. As illustrated in FIGS. 1 and 2, the information providing device includes a controller 10, an information detection device 14, and a sound output device 15 (information presentation sound output unit). These elements 10, 14, and 15 are mounted on a vehicle body 2 in a state that the elements are electrically connected to one another.

The information detection device 14 includes a vehicle interior monitoring unit 31 for monitoring the interior of the vehicle 1, and a vehicle exterior monitoring unit 32 for monitoring the exterior of the vehicle 1. The vehicle interior monitoring unit 31 includes, for example, a driver monitor camera, and the vehicle exterior monitoring unit 32 includes, for example, a vehicle exterior camera, a laser, and the like.

The sound output device 15 is an output source of various types of information presentation sounds to be provided to an occupant seated in the vehicle 1, and includes a front speaker 3, a rear speaker 4, and an audio speaker 5.

The controller 10 is a control unit including a microprocessor for controlling the units of the vehicle body 2, and various types of memories; and is also referred to as a body control module (BCM). The controller 10 receives information (various types of information on the interior and the exterior of the vehicle), which is detected by the information detection device 14, and controls the sound output device 15, based on the received information. Specifically, the controller 10 executes control of determining information to be provided each time, based on various types of information, and causing the sound output device 15 to output the determined information, in other words, information providing control.

The controller 10 includes, as a means (program) for the information providing control, an information analysis unit 11, a content determination unit 12, and an information presentation sound generation unit 13.

The information analysis unit 11 includes a traveling state determination unit 21 for determining a traveling state (e.g. a risk of collision, and the like) of the vehicle, a driver state determination unit 22 for determining a state of the driver (e.g. a degree of fatigue of the driver, and the like), and a vehicle state determination unit 23 for determining a state of the vehicle (e.g. an occurrence of a failure of the vehicle, and the like).

The information analysis unit 11 receives various types of information on the interior and the exterior of the vehicle, which are detected by the vehicle interior monitoring unit 31 and the vehicle exterior monitoring unit 32 of the information detection device 14. The determination units 21, 22, and 23 of the information analysis unit 11 respectively determine a traveling state of the vehicle, a state of the driver, and a state of the vehicle, based on the various types of information input from the information detection device 14 (the vehicle interior monitoring unit 31 and the vehicle exterior monitoring unit 32).

The content determination unit 12 determines a content of information to be provided, based on a result of analysis (determination) by the information analysis unit 11.

The information presentation sound generation unit 13 generates an information presentation sound corresponding to the information to be provided, based on the determination result by the content determination unit 12, and causes the sound output device 15 to output the generated information presentation sound.

The information presentation sound generation unit 13 includes a pitch setting unit 24 for setting a pitch (frequency configuration), which corresponds to the information to be provided, a rhythm setting unit 25 for setting a rhythm (e.g. a pattern of turning on/off a sound), which corresponds to the information to be provided, and a storage unit 26 for storing various types of data necessary for setting the pitch and the rhythm.

The information providing device according to the present embodiment provides a plurality of types of information having different levels of emergency. The level of emergency is a parameter for determining urgency of action, and can be paraphrased as a degree of importance or a degree of danger. The higher the level of emergency of information to be provided is, the stronger an urgent action is requested.

Specifically, the information to be provided is roughly classified into three types of information according to a level of emergency, namely, non-emergency information, attention-evoking information, and warning information. The level of emergency of information increases in the order of the non-emergency information, the attention-evoking information, and the warning information. In other words, information having a highest level of emergency is the warning information, information having a lowest level of emergency is the non-emergency information, and information having a medium level of emergency is the attention-evoking information.

Information included in the warning information is information that is output in a severe (dangerous) condition in which the driver is requested to take an action immediately for securing safety. A specific content of the warning information is, for example, information (ADAS warning) relating to a risk of collision and the like of the vehicle, which is provided from an advanced driver assist system (ADAS) equipped in the vehicle, information relating to a severe anomaly (failure) (e.g. an engine water temperature anomaly or an engine system anomaly), which may make the vehicle to be unable to travel, information relating to an extremely unsafe operation by the driver (e.g. a seatbelt is not fastened, or unlocking a parking brake is forgotten), which may directly lead to a severe accident, and the like.

Information included in the attention-evoking information is information that is output in a condition in which an urgent action is requested, although the level of emergency is not so high, as compared with a case of the warning information, in other words, a relatively urgent action for securing safety is requested to the driver. A specific content of the attention-evoking information is, for example, information on a vehicle located at a blind spot, which is provided from a blind spot monitor (BSM), information on deviation from a traveling lane, which is provided from a lane deviation warning system (LDW), and the like.

Information included in the non-emergency information is information that is output in a condition in which the necessity of an urgent action is relatively low. A specific content of the non-emergency information is, for example, information relating to an unsafe state of the driver (e.g. driver fatigue information to be provided from a driver fatigue detection system (DAA)) of such an extent that the necessity of an action depends on determination by the driver, information relating to a traveling environment (e.g. a risk of road surface freezing due to lowering of an ambient temperature) of such an extent that the necessity of an action depends on determination by the driver, information on acceptance, finishing, and refusal of an operation of each piece of the equipment, information relating to an operation state of each piece of the equipment (e.g. activation of a turn signal lamp or a hazard lamp), information relating to an incoming phone call, information notifying reception of a mail or an SMS message, information notifying start or end of navigation (VUI) by voice, and the like.

The pitch setting unit 24 variably sets the pitch of the information presentation sound according to determination as to whether the information to be provided is the non-emergency information, the attention-evoking information, or the warning information. In the present embodiment, as the information presentation sound, a synthetic sound acquired by combining a fundamental tone having a specific frequency, and at least one harmonic tone having a frequency equal to an integral multiple of the frequency of the fundamental tone is generated. This is for the purpose of presenting a large number of contents within a limited frequency range by increasing variations of tone colors of an information presentation sound. The pitch setting unit 24 generates an information presentation sound having a different pitch for each level of emergency of information by variably setting a frequency configuration of the fundamental tone and the harmonic tone constituting the information presentation sound according to a level of emergency of information to be provided. Conversely, when the level of emergency of information is the same, the pitch of the information presentation sound is set to be the same.

As described above, the information presentation sound according to the present embodiment is presented as a sound having a same pitch, when a level of emergency of information is the same, and is presented as a sound having a different pitch, when a level of emergency of information is different. Thus, the user (an occupant such as the driver) can accurately recognize what level of emergency of information, each of various information presentation sounds provides.

Since the information presentation sound is a synthetic sound acquired by combining a fundamental tone and a harmonic tone, simply evaluating the pitch of the information presentation sound in terms of a frequency of the fundamental tone may make it impossible to appropriately evaluate the pitch that is actually sensed by a human. In view of the above, in the present embodiment, a centroid frequency (spectral centroid) being a weighted average of frequencies weighed by a parameter associated with a sound pressure is employed, as an index for evaluating the pitch of each of information presentation sounds. By classifying and using the centroid frequencies according to a level of emergency of information, an information presentation sound having a different pitch for each level of emergency of information is generated. As the parameter associated with a sound pressure, a sound pressure value indicating a sound pressure itself may be employed, or a loudness value being a corrected sound pressure value that reflects a sound pressure sensitivity (equal loudness curve) for each of frequency components may be employed. Hereinafter, a parameter associated with these sound pressures may be simply and generically referred to as a sound pressure parameter.

The centroid frequency of the information presentation sound is calculated according to the following formula (1).

[Formula 1]

$$\text{Centroid frequency} = \{f(1) \cdot d(1) + f(2) \cdot d(2) + \ldots + f(N) \cdot d(N)\} / \{f(1) + f(2) + \ldots + f(N)\} \quad (1)$$

where f (1) is a frequency of the fundamental tone, and f (n) is a frequency of the n-th harmonic tone. Further, d (1) is a sound pressure parameter of the fundamental tone, and d (n) is a sound pressure parameter of the n-th harmonic tone.

Setting a pitch (centroid frequency) of the information presentation sound is described in more details. The pitch setting unit 24 prepares information presentation sounds each having a pitch according to a level of emergency of information by using a plurality of classification frequency ranges that are determined in advance. The plurality of the classification frequency ranges are determined to have a different band according to a level of emergency of information, and are stored in advance in the storage unit 26.

Figure 3:
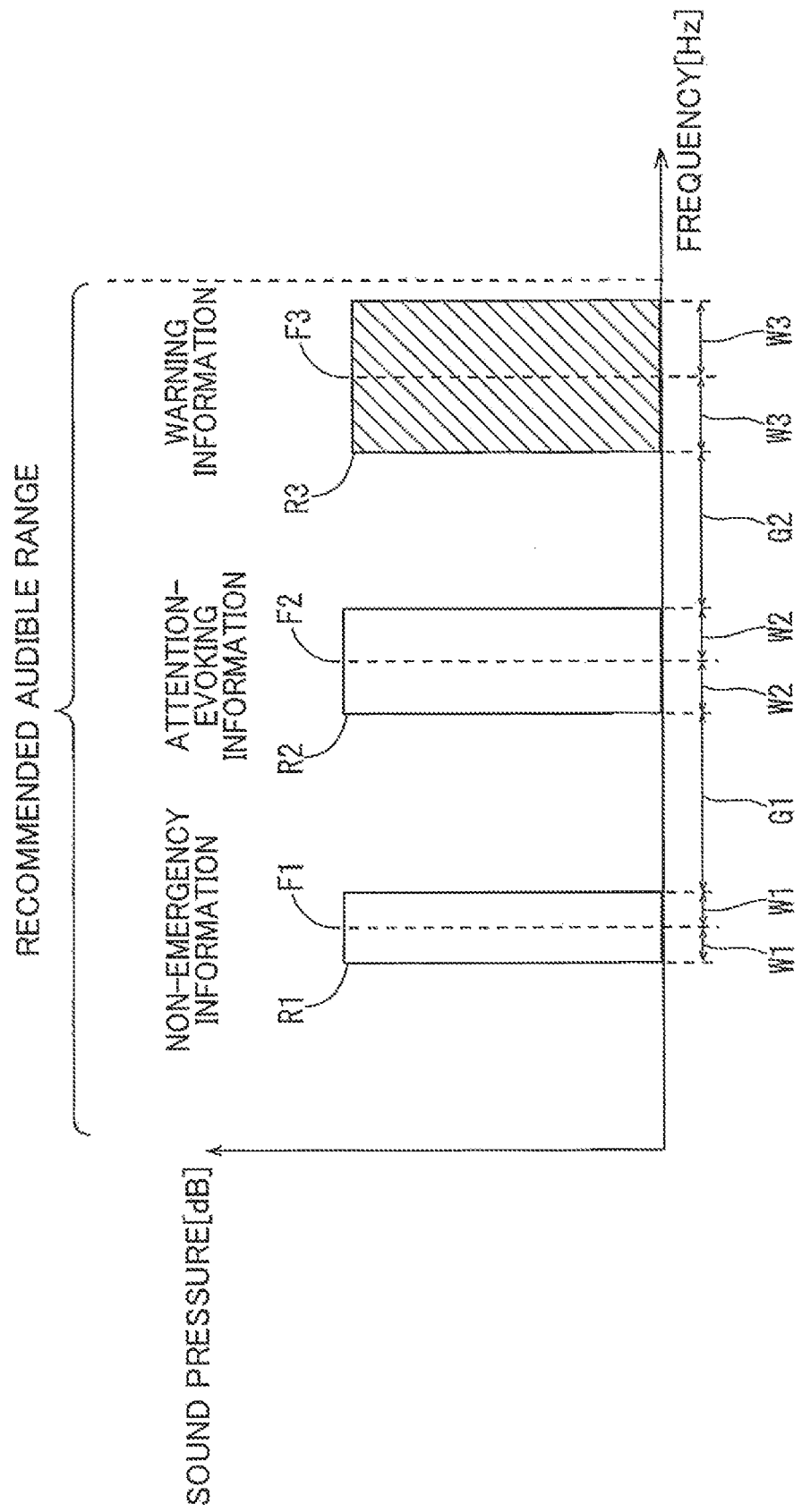
FIG. 3 is a diagram illustrating a setting example of a classification frequency range according to a level of emergency of information.

FIG. 3 is a diagram illustrating a setting example of the classification frequency ranges. As illustrated in FIG. 3, the storage unit 26 stores in advance three classification frequency ranges R1, R2, and R3 that are classified according to a level of emergency of information within a recommended audible range being a frequency range of 3000 Hz or less. The classification frequency ranges R1, R2, and R3 are arranged in this order from the low frequency side. Specifically, magnitudes of center frequencies F1, F2, F3 being median values of bands of the classification frequency ranges R1, R2, R3 satisfy: F1<F2<F3.

The centroid frequency of the information presentation sound is set to lie within one of the classification frequency ranges R1, R2, and R3. For example, an information presentation sound presenting information having a same level of emergency is set to be a sound having a centroid frequency (having a same pitch) within a same classification frequency range, and an information presentation sound presenting information having a different level of emergency is set to be a sound having a centroid frequency (having a different pitch) within a different classification frequency range. In this way, providing a sound having a different pitch according to a level of emergency of information as an information presentation sound allows a user to appropriately and intuitively recognize overall characteristics (a level of emergency) of the provided information.

More specifically, the classification frequency ranges R1, R2, and R3 respectively correspond to the non-emergency information, the attention-evoking information, and the warning information. For example, when information to be provided is the non-emergency information having a low level of emergency, the pitch setting unit 24 prepares an information presentation sound having a centroid frequency within the classification frequency range R1 located in a lowest frequency band. Likewise, when information to be provided is the attention-evoking information, whose level of emergency is medium, the pitch setting unit 24 prepares an information presentation sound having a centroid frequency within the classification frequency range R2 located in an intermediate frequency band. When information to be provided is the warning information having a high level of emergency, the pitch setting unit 24 prepares an information presentation sound having a centroid frequency within the classification frequency range R3 located in a highest frequency band.

Discrimination of pitches of information presentation sounds according to a level of emergency as described above is achieved by adjusting a frequency and a sound pressure of each of a fundamental tone and a harmonic tone constituting an information presentation sound. For example, when an infatuation presentation sound presenting the non-emergency information is prepared, the pitch setting unit 24 adjusts a frequency and a sound pressure of each of the fundamental tone and the harmonic tone constituting the information presentation sound in such a way that centroid frequencies of the fundamental tone and the harmonic tone respectively lie within the classification frequency range R1.

In the present example embodiment, the three classification frequency ranges R1, R2, and R3 corresponding to information having different levels of emergency (non-emergency information, attention-evoking information, and warning information) are set to be arranged in this order from the low frequency side. This is taking into consideration sensitivity characteristics of the hearing ability of a human.

Figure 4:
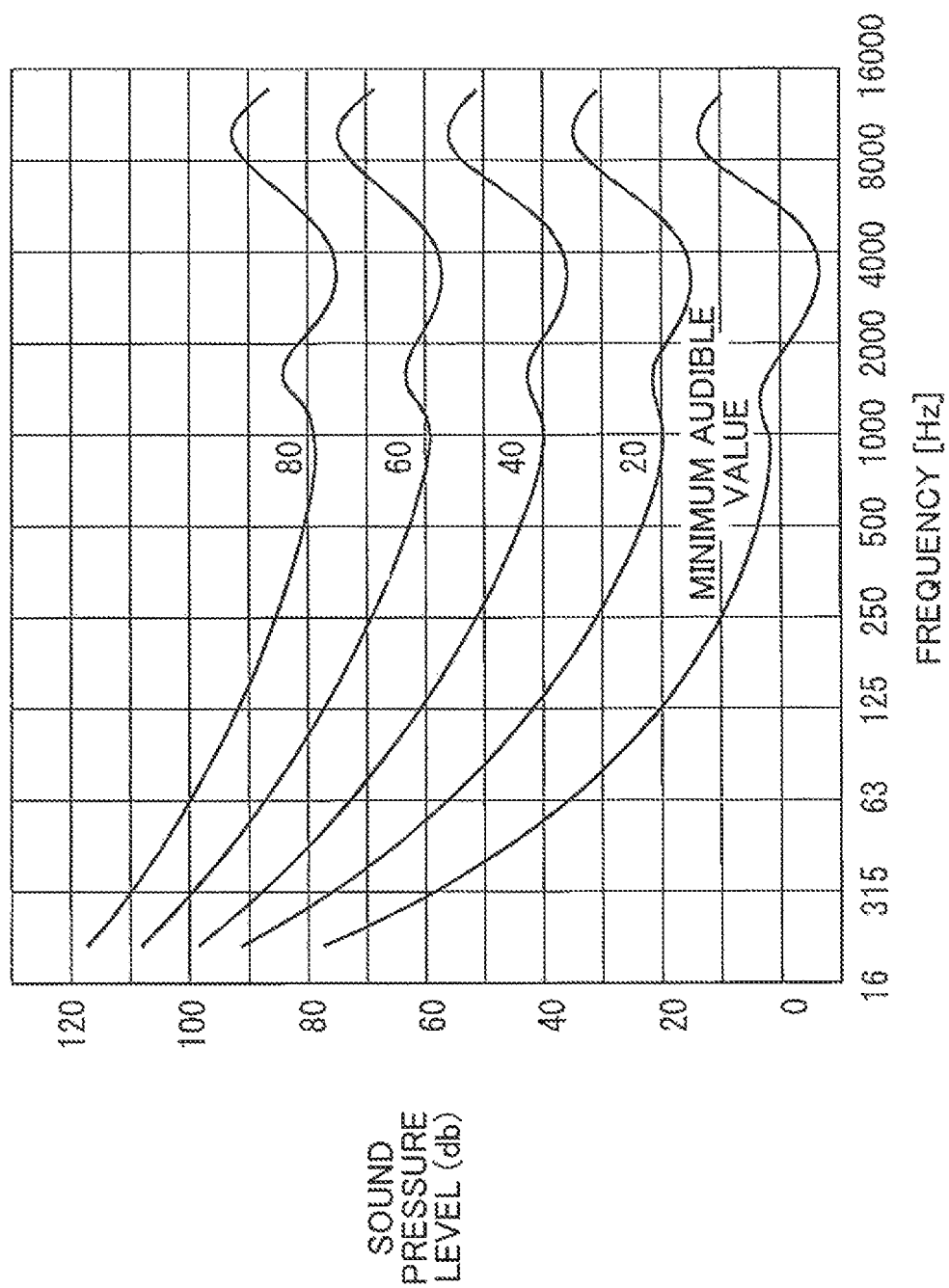
FIG. 4 is a graph illustrating a relationship between a sound pressure level audible by a human and a frequency.

Specifically, the hearing ability of a human has a property such that the human can hear (discriminate) a sound on a high frequency side (particularly, a sound from 2000 Hz to 4000 Hz), even if a sound pressure level is low, as far as the sound lies within an audible frequency range. FIG. 4 is a graph illustrating a relationship (a sensitivity with respect to a sound) between an audible sound pressure level being a sound pressure level audible by a human, and a frequency. In the graph, the horizontal axis denotes a frequency, and the vertical axis denotes a sound pressure level. Further, among a plurality of curves in the graph, a curve of a "minimum audible value" indicates a minimum value of the audible sound pressure level, and curves of "20", "40", "60", and "80" (each of the numerical values indicates the age) indicate audible sound pressure levels of hearers according to ages. As is understood from the graph of FIG. 4, the sensitivity of a human with respect to a sound is highest in a high frequency band from about 2000 to 4000 Hz.

In the present embodiment, as described above, the classification frequency ranges R1, R2, and R3 of information presentation sounds are set in such a way that an information presentation sound presenting information having a high level of emergency has a high pitch in the recommended audible range (band of 3000 Hz or less). In other words, in the present embodiment, when the characteristics of FIG. 4 are taken into consideration, information having a higher level of emergency is provided by an information presentation sound having a high pitch that is easily recognizable to a user. Thus, the user can securely recognize information having a high level of emergency.

Widths acquired by dividing the entire widths of the classification frequency ranges R1, R2, and R3 from a lower limit to an upper limit into two parts at positions of the center frequencies F1, F2, and F3 are respectively defined as one side widths W1, W2, and W3. In other words, the one side width W1 is a difference between an upper limit frequency or a lower limit frequency of the classification frequency range R1, and the center frequency F1; the one side width W2 is a difference between an upper limit frequency or a lower limit frequency of the classification frequency range R2, and the center frequency F2; and the one side width W3 is a difference between an upper limit frequency or a lower limit frequency of the classification frequency range R3, and the center frequency F3. The one side widths W1, W2, and W3 are set to increase in this order.

Specifically, in the present embodiment, the one side widths W1, W2, and W3 of the classification frequency ranges R1, R2, and R3 are set in such a way that a one side width of a classification frequency range having a center frequency of 500 Hz or less is 100 Hz or less, and a one side width of a classification frequency range having a center frequency exceeding 500 Hz is not larger than a value acquired by multiplying the center frequency by 0.2, but exceeds 100 Hz.

For example, it is assumed that the center frequencies F1, F2, and F3 of the classification frequency ranges R1, R2, and R3 are respectively 500 Hz, 1000 Hz, and 2000 Hz. In this case, the one side width of the classification frequency range R1 having the center frequency F1 of 500 Hz is set to 100 Hz or less (the entire width is 200 Hz or less); the one side width of the classification frequency range R2 having the center frequency F2 of 1000 Hz is set to 200 Hz or less but exceed 100 Hz (the entire width is 400 Hz or less but exceeds 200 Hz), and the one side width of the classification frequency range R3 having the center frequency F3 of 2000 Hz is set to 400 Hz or less but exceed 200 Hz (the entire width is 800 Hz or less but exceeds 400 Hz).

Setting the widths of the classification frequency ranges R1, R2, and R3 to have a configuration as described above is taking into consideration a critical bandwidth (frequency resolution) of the hearing ability of a human. The critical bandwidth is a frequency range within which a sound can be heard to have a same pitch.

Figure 5:
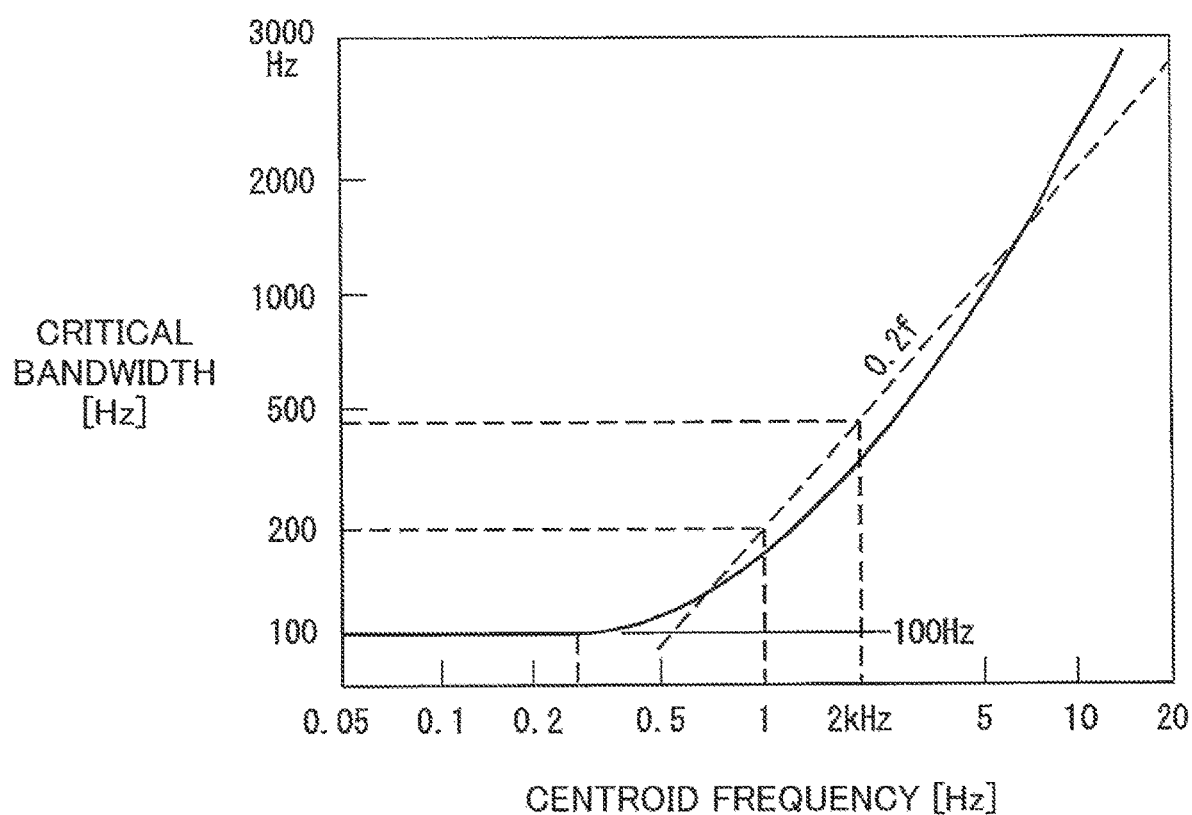
FIG. 5 is a graph illustrating a relationship between a critical bandwidth of the hearing ability of a human and a frequency.

Specifically, the hearing ability of a human has a property such that the critical bandwidth increases toward a high sound range. FIG. 5 is a graph illustrating a relationship between a critical bandwidth of the hearing ability of a human, and a frequency. In the graph, the horizontal axis denotes a centroid frequency being a weighted average of frequencies weighed by a sound pressure parameter, and the vertical axis denotes a critical bandwidth (a range within which a sound can be heard to have a same pitch). As is understood from the graph of FIG. 5, in a range having a centroid frequency of 500 Hz or less, the critical bandwidth is substantially fixed to 100 Hz. On the other hand, in a range having a centroid frequency exceeding 500 Hz, the critical bandwidth is about 0.2×frequency. In other words, a frequency range within which a sound can be heard to have a same pitch by a human is ±100 Hz when the centroid frequency is 500 Hz or less, and is ±0.2×frequency when the centroid frequency exceeds 500 Hz.

As described above, in the present embodiment, a one side width of a classification frequency range having a center frequency of 500 Hz or less is set to 100 Hz or less, and a one side width of a classification frequency range having a center frequency exceeding 500 Hz is set to be not larger than a value acquired by multiplying the center frequency by 0.2. In other words, in the present embodiment, when the characteristics of FIG. 5 are taken into consideration, each of the widths of the classification frequency ranges R1, R2, and R3 is set to be a width such that a sound can be heard to have a same pitch by the user. Also regarding each of the classification frequency ranges R1, R2, and R3, a sound having a lower limit frequency or an upper limit frequency, and a sound having a center frequency of each of the ranges can be heard to have a same pitch. Thus, for example, even when a plurality of information presentation sounds each having a centroid frequency at a different position within a certain classification frequency range are generated in association with various pieces of information having a same level of emergency, the user can sense that these information presentation sounds have a same pitch, and can intuitively recognize that information having a same level of emergency is provided.

The classification frequency range R3 having a highest center frequency among the classification frequency ranges R1, R2, and R3 is set in such a way that a frequency of 1.2 times of the center frequency F3 is 3000 Hz, which is an upper limit of the recommended audible range, or less. Thus, even when the one side width W3 of the classification frequency range R3 on the highest frequency side is set to a maximum frequency (F3×0.2), there is no likelihood that the upper limit frequency of the classification frequency range R3 exceeds the upper limit of the recommended audible range. Therefore, it is possible to allow all of the classification frequency ranges R1, R2, and R3 to lie within the recommended audible range. When the center frequency F3 of the classification frequency range R3 is set to 2500 Hz, the upper limit of the one side width W3 of the classification frequency range R3 is 500 Hz, and when the one side width W3 is set to 500 Hz, which is the upper limit of the one side width W3, the upper limit frequency of the classification frequency range R3 is 3000 Hz.

As illustrated in FIG. 3, the classification frequency ranges R1, R2, and R3 are set in such a way that intervals G1 and G2 between the adjacent classification frequency ranges are each set to 500 Hz or more. Specifically, when all the classification frequency ranges R1, R2, and R3 are allowed to lie within the recommended audible range as described above, the center frequency F3 of the classification frequency range R3 on the highest frequency side is set to about 2500 Hz at most. Further, resolution (critical bandwidth) of the hearing ability of a human with respect to a sound having a centroid frequency of 2500 Hz is 500 Hz. Therefore, as far as the interval between adjacent classification frequency ranges is 500 Hz or more, the user can recognize a sound having a centroid frequency in each of the classification frequency ranges R1, R2, and R3, as a sound having a different pitch.

As described above, each of the widths of the classification frequency ranges R1, R2, and R3 is set in such a way that the pitch of an information presentation sound having a centroid frequency therein is the same. However, even when a sound has a centroid frequency (in other words, has a same pitch) within a same classification frequency range, it is possible to use the sound as an information presentation sound presenting information of a different content by changing the tone color of the sound. For example, it is possible to allow a user to recognize a difference in content of information by generating an information presentation sound of a different tone color with respect to a plurality of pieces of information in which a level of emergency is the same but a content is different, based on a sound source of various musical instruments (such as a piano, a guitar, and a violin).

Further, changing the rhythm of the information presentation sound is also effective in order to express a difference in content of information by a sound belonging to a same classification frequency range. As a method for changing the rhythm of the information presentation sound, for example, changing a pattern of turning on/off a sound in one cycle, changing the number of notes included in one cycle, and changing the presence or absence of repetition of a cycle are exemplified. Changing the rhythm by these methods is particularly effective in the classification frequency range R1 on the lowest frequency side. Specifically, since the width of the classification frequency range R1 is narrow, there is a limitation in increasing variations of an information presentation sound belonging to the classification frequency range R1 merely by changing the tone color. Enabling to change not only the tone color but also the rhythm makes it easy to increase variations of the information presentation sound.

Figure 6:
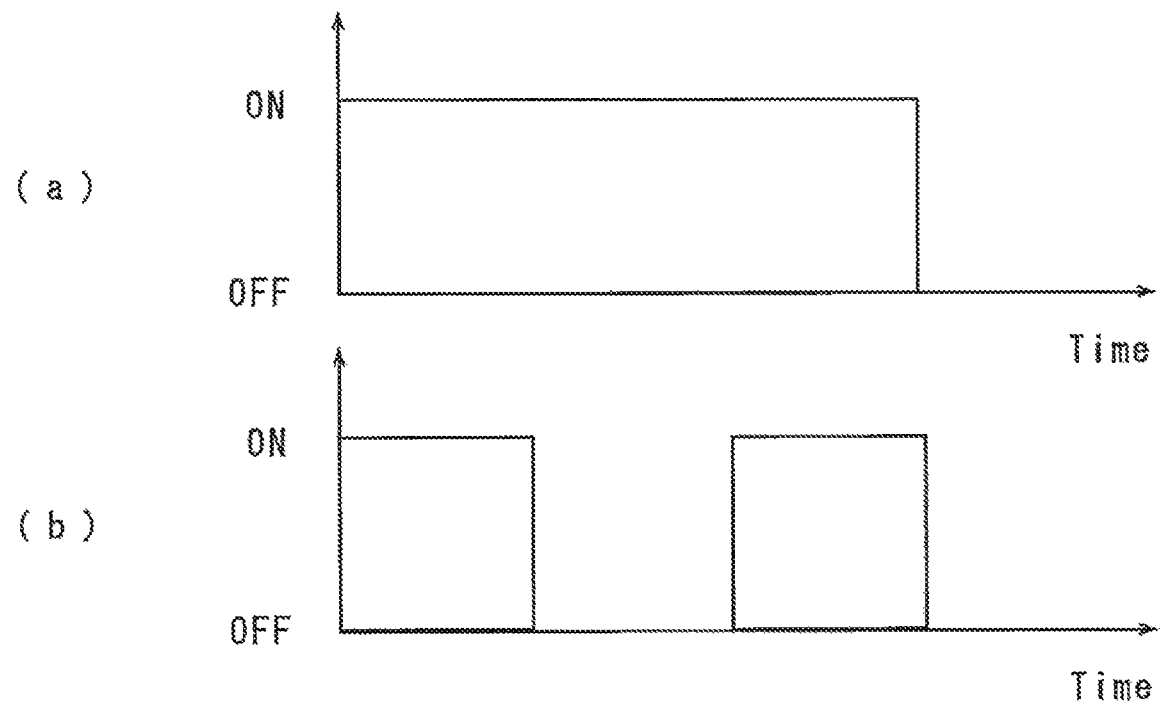
FIG. 6 is a diagram illustrating one example of changing the rhythm of an information presentation sound.

FIG. 6 is a diagram illustrating one example of changing the rhythm of the information presentation sound. As illustrated in FIG. 6, changing the rhythm of the information presentation sound can be achieved by changing a pattern of turning on/off a sound (a duration of each of an on-time and an off-time, and combination thereof). Specifically, whereas, in the pattern illustrated by the chart (a) of FIG. 6, an on-state (a state that a sound is output) is continued for one cycle of an information presentation sound, in the pattern illustrated by the chart (b), two on-states and one off-state (a state that a sound is not output) appear in the order of on off on during one cycle of an information presentation sound.

Next, a procedure of the information providing control to be executed in the present embodiment is described in detail with reference to the flowchart of FIG. 7. When the information providing control is started, first, in Step S1, determination is made as to whether a warning (ADAS warning) indicating that there is a risk of collision of the vehicle is output from an advanced driver assist system (ADAS).

When it is determined in Step S1 that an ADAS warning is output, the control proceeds to Step S2, and determination is made as to whether it is necessary to take an action for avoiding the collision (whether a risk of collision is approaching).

When it is determined in Step S2 that it is necessary to take an action for avoiding the collision, the control proceeds to Step S3, and an information presentation sound having a high centroid frequency included in the classification frequency range R3 (e.g. 2000±400 Hz), in other words, an information presentation sound (warning sound) presenting warning information having a high level of emergency is continuously output until the collision is avoided. Specifically, the pitch setting unit 24 adjusts a frequency and a sound pressure of each of a fundamental tone and a harmonic tone constituting an information presentation sound in such a way that a centroid frequency being a weighted average of frequencies weighed by a sound pressure parameter lies within the classification frequency range R3 (in other words, in such a way that an information presentation sound having a relatively high pitch corresponding to the range R3 is generated). Further, the rhythm setting unit 25 sets the rhythm of the information presentation sound in such a way that a sound output (on-state) is continued until the collision is avoided.

On the other hand, when it is determined in Step S2 that an action for avoiding the collision is not particularly necessary, the control proceeds to Step S4, and an information presentation sound (warning sound) having a high centroid frequency included in the classification frequency range R3 is output for a time corresponding to one cycle. Specifically, a frequency and a sound pressure of each of a fundamental tone and a harmonic tone constituting an information presentation sound are adjusted in such a way that an information presentation sound having a relatively high pitch such that the centroid frequency lies within the classification frequency range R3 is generated; and the rhythm of the information presentation sound is set to a predetermined sound generation pattern in which the sound output is finished within one cycle.

When it is determined in Step S1 that an ADAS warning is not output, the control proceeds to Step S5, and determination is made as to whether a severe anomaly of the vehicle (e.g. an engine water temperature anomaly or an engine system anomaly), or a severe unsafe operation (e.g. a seatbelt is not fastened, or unlocking a parking brake is forgotten) is detected.

When it is determined in Step S5 that a severe anomaly of the vehicle or a severe unsafe operation is detected, the control proceeds to Step S4, and an information presentation sound (warning sound) having a high centroid frequency included in the classification frequency range R3 is output for a time corresponding to one cycle.

On the other hand, when it is determined in Step S5 that a severe anomaly of the vehicle or a severe unsafe operation is not detected, the control proceeds to Step S6, and determination is made as to whether it is necessary to evoke attention to the driver. For example, when a vehicle located at a blind spot is detected by a blind spot monitor (BSM), or when deviation from a traveling lane is detected by a lane deviation warning system (LDW), it is determined that it is necessary to evoke attention.

When it is determined in Step S6 that it is necessary to evoke attention to the driver, the control proceeds to Step S7, and an information presentation sound having a centroid frequency of a medium level included in the classification frequency range R2 (e.g. 1000±200 Hz), in other words, an information presentation sound (attention-evoking sound) presenting attention-evoking information, whose level of emergency is medium, is output for a time corresponding to one cycle. Specifically, a frequency and a sound pressure of each of a fundamental tone and a harmonic tone constituting an information presentation sound are adjusted in such a way that an information presentation sound of a medium pitch such that the centroid frequency lies within the classification frequency range R2 is generated; and the rhythm of the information presentation sound is set to a predetermined sound generation pattern in which the sound output is finished within one cycle.

On the other hand, when it is determined in Step S6 that evoking attention to the driver is not necessary, in other words, when it is confirmed that the information to be provided is neither the warning information nor the attention-evoking information, the control proceeds to Step S8, and an information presentation sound having a low centroid frequency included in the classification frequency range R1 (e.g. 500±100 Hz), in other words, an information presentation sound (notification sound) presenting non-emergency information, whose level of emergency is low, is output for a time corresponding to one cycle. Specifically, a frequency and a sound pressure of each of a fundamental tone and a harmonic tone constituting an information presentation sound are adjusted in such a way that an information presentation sound having a relatively low pitch such that the centroid frequency lies within the classification frequency range R1 is generated; and the rhythm of the information presentation sound is set to a predetermined sound generation pattern in which the sound output is finished within one cycle.

In the foregoing, an embodiment according to the present invention has been described. The present invention, however, is not limited to the embodiment. Any modification is available, as far as the modifications fall within the range of the claims.

Overview of Embodiment

The following is an overview of the embodiment.

An information providing device according to the embodiment provides various types of information by using an information presentation sound including a fundamental tone, and at least one harmonic tone having a frequency equal to an integral multiple of a frequency of the fundamental tone. The information providing device includes: a pitch setting unit that sets a pitch of the information presentation sound; and an information presentation sound output unit that outputs the information presentation sound having the pitch set by the pitch setting unit. When it is assumed that a weighted average of frequencies weighed by a parameter associated with a sound pressure is a centroid frequency, the pitch setting unit variably sets the centroid frequency of the information presentation sound according to a type of information to be provided.

In this configuration, since a synthetic sound acquired by combining the fundamental tone and the harmonic tone is used as the information presentation sound, it is possible to generate various types of information presentation sounds within a limited frequency range, and it is possible to provide a user with various pieces of information by using the information presentation sounds. Further, the centroid frequency (spectral centroid), which is determined not only by the frequencies of the fundamental tone and the harmonic tone constituting the information presentation sound but also by taking into consideration a sound pressure, is changed according to the type of information to be provided. Therefore, it is possible to appropriately generate a plurality of information presentation sounds having different pitches in a discriminative manner in association with types of information, while using a pitch that is actually sensed by the user as a reference. Thus, the user can easily discriminate the type of provided information, based on the pitch of the information presentation sound that is actually sensed.

Preferably, the parameter associated with the sound pressure may be a sound pressure value indicating a sound pressure itself, or a loudness value being a corrected sound pressure value that reflects a sound pressure sensitivity for each of frequency components.

In this configuration, it is possible to determine the centroid frequency that appropriately reflects the sound pressure of each of the fundamental tone and the harmonic tone.

Preferably, the information providing device may further include a storage unit that stores a plurality of classification frequency ranges acquired by classifying frequencies according to a type of information. The pitch setting unit may select a specific one of the classification frequency ranges according to a type of information to be provided, and set a frequency included in the selected classification frequency range, as the centroid frequency of the information presentation sound.

In this configuration, it is possible to appropriate generate a plurality of information presentation sounds each having a different centroid frequency for each of the types of information by using the plurality of classification frequency ranges that are determined in advance, and the user can easily discriminate the type of information.

Preferably, the plurality of the classification frequency ranges may be classified according to a level of emergency of information. A center frequency of a classification frequency range corresponding to information having a high level of emergency may be higher than a center frequency of a classification frequency range corresponding to information having a low level of emergency.

In this configuration, since information having a high level of emergency is provided by an information presentation sound having a high pitch, which can be easily heard, even if the sound pressure level is low, the user can accurately recognize the information having the high level of emergency.

When it is assumed that a difference between an upper limit frequency or a lower limit frequency, and a center frequency of the classification frequency range is a one side width of the classification frequency range, preferably, the plurality of the classification frequency ranges may be set in such a way that a one side width of a classification frequency range having a center frequency of 500 Hz or less is set to 100 Hz or less, and a one side width of a classification frequency range having a center frequency exceeding 500 Hz is set to be not larger than a value acquired by multiplying the center frequency by 0.2 but exceed 100 Hz.

In this configuration, since each of the widths of the plurality of the classification frequency ranges is set to be a width within which a sound can be heard by the user to have a same pitch, even if a plurality of information presentation sounds each having a centroid frequency at a different position within a certain classification frequency range are generated, for example, the user can sense that these information presentation sounds have a same pitch, and can intuitively recognize that information of a same type is provided. Further, since the width of a classification frequency range located on a high frequency side can be increased, it is easy to increase variations of tone colors of the information presentation sound.

Preferably, a classification frequency range having a highest center frequency among the plurality of the classification frequency ranges may be set in such a way that a frequency of 1.2 times of the center frequency is 3000 Hz or less.

In this configuration, even when the width of the classification frequency range having the highest center frequency is set to a maximum value within a range in which the sound can be heard to have a same pitch, it is possible to allow all the classification frequency ranges to lie within a frequency range of 3000 Hz or less, which is a recommended audible range.

Preferably, the plurality of the classification frequency ranges may be set in such a way that an interval between classification frequency ranges adjacent to each other is 500 Hz or more.

In this configuration, since a sound having a centroid frequency within a different classification frequency range is securely recognized as a sound having a different pitch, the user can easily discriminate a type of information.

The invention claimed is:

1. An information providing device for providing various types of information by using an information presentation sound including a fundamental tone, and at least one harmonic tone having a frequency equal to an integral multiple of a frequency of the fundamental tone, comprising:
   a pitch setting unit that sets a pitch of the information presentation sound; and
   an information presentation sound output unit that outputs the information presentation sound having the pitch set by the pitch setting unit, wherein
   when a weighted average of frequencies weighed by a parameter associated with a sound pressure is a centroid frequency, the pitch setting unit variably sets the centroid frequency of the information presentation sound according to a type of information to be provided.

2. The information providing device according to claim 1, wherein
   the parameter associated with the sound pressure is a sound pressure value indicating a sound pressure itself, or a loudness value being a corrected sound pressure value that reflects a sound pressure sensitivity for each of frequency components.

3. The information providing device according to claim 1, further comprising
   a storage unit that stores a plurality of classification frequency ranges acquired by classifying frequencies according to a type of information, wherein
   the pitch setting unit selects a specific one of the classification frequency ranges according to a type of information to be provided, and sets a frequency included in the selected classification frequency range, as the centroid frequency of the information presentation sound.

4. The information providing device according to claim 2, further comprising
   a storage unit that stores a plurality of classification frequency ranges acquired by classifying frequencies according to a type of information, wherein
   the pitch setting unit selects a specific one of the classification frequency ranges according to a type of information to be provided, and sets a frequency included in the selected classification frequency range, as the centroid frequency of the information presentation sound.

5. The information providing device according to claim 3, wherein
   the plurality of the classification frequency ranges are classified according to a level of emergency of information, and
   a center frequency of a classification frequency range corresponding to information having a high level of emergency is higher than a center frequency of a classification frequency range corresponding to information having a low level of emergency.

6. The information providing device according to claim 4, wherein
   the plurality of the classification frequency ranges are classified according to a level of emergency of information, and
   a center frequency of a classification frequency range corresponding to information having a high level of emergency is higher than a center frequency of a classification frequency range corresponding to information having a low level of emergency.

7. The information providing device according to claim 3, wherein
   when a difference between an upper limit frequency or a lower limit frequency, and a center frequency of the classification frequency range is a one side width of the classification frequency range, the plurality of the classification frequency ranges are set in such a way that a one side width of a classification frequency range having a center frequency of 500 Hz or less is set to 100 Hz or less, and a one side width of a classification frequency range having a center frequency exceeding 500 Hz is set to be not larger than a value acquired by multiplying the center frequency by 0.2 but exceed 100 Hz.

8. The information providing device according to claim 4, wherein
   when a difference between an upper limit frequency or a lower limit frequency, and a center frequency of the classification frequency range is a one side width of the classification frequency range, the plurality of the classification frequency ranges are set in such a way that a one side width of a classification frequency range having a center frequency of 500 Hz or less is set to 100 Hz or less, and a one side width of a classification frequency range having a center frequency exceeding 500 Hz is set to be not larger than a value acquired by multiplying the center frequency by 0.2 but exceed 100 Hz.

9. The information providing device according to claim 5, wherein
   when a difference between an upper limit frequency or a lower limit frequency, and a center frequency of the classification frequency range is a one side width of the classification frequency range, the plurality of the classification frequency ranges are set in such a way that a one side width of a classification frequency range having a center frequency of 500 Hz or less is set to 100 Hz or less, and a one side width of a classification frequency range having a center frequency exceeding 500 Hz is set to be not larger than a value acquired by multiplying the center frequency by 0.2 but exceed 100 Hz.

10. The information providing device according to claim 6, wherein
    when a difference between an upper limit frequency or a lower limit frequency, and a center frequency of the classification frequency range is a one side width of the classification frequency range, the plurality of the classification frequency ranges are set in such a way that a one side width of a classification frequency range having a center frequency of 500 Hz or less is set to 100 Hz or less, and a one side width of a classification frequency range having a center frequency exceeding 500 Hz is set to be not larger than a value acquired by multiplying the center frequency by 0.2 but exceed 100 Hz.

11. The information providing device according to claim 3, wherein
    a classification frequency range having a highest center frequency among the plurality of the classification frequency ranges is set in such a way that a frequency of 1.2 times of the center frequency is 3000 Hz or less.

12. The information providing device according to claim 4, wherein
   a classification frequency range having a highest center frequency among the plurality of the classification frequency ranges is set in such a way that a frequency of 1.2 times of the center frequency is 3000 Hz or less.

13. The information providing device according to claim 5, wherein
   a classification frequency range having a highest center frequency among the plurality of the classification frequency ranges is set in such a way that a frequency of 1.2 times of the center frequency is 3000 Hz or less.

14. The information providing device according to claim 6, wherein
   a classification frequency range having a highest center frequency among the plurality of the classification frequency ranges is set in such a way that a frequency of 1.2 times of the center frequency is 3000 Hz or less.

15. The information providing device according to claim 9, wherein
   a classification frequency range having a highest center frequency among the plurality of the classification frequency ranges is set in such a way that a frequency of 1.2 times of the center frequency is 3000 Hz or less.

16. The information providing device according to claim 10, wherein
   a classification frequency range having a highest center frequency among the plurality of the classification frequency ranges is set in such a way that a frequency of 1.2 times of the center frequency is 3000 Hz or less.

17. The information providing device according to claim 3, wherein
   the plurality of the classification frequency ranges are set in such a way that an interval between classification frequency ranges adjacent to each other is 500 Hz or more.

18. The information providing device according to claim 4, wherein
   the plurality of the classification frequency ranges are set in such a way that an interval between classification frequency ranges adjacent to each other is 500 Hz or more.

19. The information providing device according to claim 15, wherein
   the plurality of the classification frequency ranges are set in such a way that an interval between classification frequency ranges adjacent to each other is 500 Hz or more.

20. The information providing device according to claim 16, wherein
   the plurality of the classification frequency ranges are set in such a way that an interval between classification frequency ranges adjacent to each other is 500 Hz or more.

* * * * *